United States Patent [19]
Azema

[11] Patent Number: 5,876,315
[45] Date of Patent: Mar. 2, 1999

[54] COUPLING MECHANISM FOR TOOL CASSETTES IN A MACHINING UNIT

[75] Inventor: Andre Azema, Saix, France

[73] Assignee: Renault-Automation, Boulogne-Billancourt, France

[21] Appl. No.: 945,317

[22] PCT Filed: Apr. 26, 1996

[86] PCT No.: PCT/FR96/00641

§ 371 Date: Dec. 9, 1997

§ 102(e) Date: Dec. 9, 1997

[87] PCT Pub. No.: WO96/33840

PCT Pub. Date: Oct. 31, 1996

[30] Foreign Application Priority Data

Apr. 28, 1995 [FR] France .................................. 95 05130

[51] Int. Cl.[6] .................................................. B32Q 3/157
[52] U.S. Cl. .............................................. 483/32; 483/56
[58] Field of Search .................................. 483/32, 54, 55, 483/56, 57, 60, 61, 58, 59, 31; 29/26 R, 26 A

[56] References Cited

U.S. PATENT DOCUMENTS

| | | | |
|---|---|---|---|
| 4,216,572 | 8/1980 | Matsushita et al. | 29/26 X |
| 4,354,306 | 10/1982 | Ida et al. | 483/32 |
| 4,776,081 | 10/1988 | Okunishi et al. | 483/32 X |

FOREIGN PATENT DOCUMENTS

| | | | |
|---|---|---|---|
| 193465 | 9/1986 | European Pat. Off. . | |
| 283366 | 9/1988 | European Pat. Off. | 483/32 |
| 2090375 | 1/1972 | France . | |
| 1062609 | 1/1983 | Japan | 483/32 |
| 178609 | 1/1983 | Japan . | |
| 71013 | 4/1983 | Japan | 483/32 |
| 71014 | 4/1983 | Japan | 483/32 |
| 102807 | 5/1988 | Japan | 483/32 |
| 196343 | 8/1988 | Japan . | |
| 1119820 | 10/1984 | U.S.S.R. . | |
| 2108019 | 5/1983 | United Kingdom | 483/32 |

*Primary Examiner*—William R. Briggs
*Attorney, Agent, or Firm*—Oblon, Spivak, McCleeland, Maier & Neustadt, P.C.

[57] ABSTRACT

A mechanism for coupling tooling cassettes (60) in a numerical control machining unit for a transfer machine of the type comprising a frame (10) with rails (11, 12) for moving (X arrow) a vertical knee (20) with two posts (21 and 22) also provided with rails (21*a* and 22*b*) on which a movable headstock (30) slides (Y arrow), with a spindle-supporting slide (40) passing through the headstock (Z arrow); and a magazine (50) for a tooling cassette (60) positioned on the headstock (30), surrounding the knee (20), and through which the slide (40) may pass, comprising a ring (5) supporting the cassettes (60) and rotatably mounted (R arrow) about the knee (20). The mechanism for coupling the cassettes (60) bears on the rotation guide (R arrow) of the ring (51) of the rotating magazine (50) around a circular track (52) integral with the frame (10) and provided at its base with a triangular way (52*a*) with rollers (62*a*, 62*b*) retained and guided therein, wherein said rollers are associated with said cassettes (60) for rotating with the cassettes (60) driven by the ring (51). The invention is useful for transfer machines, machining cells and the like.

12 Claims, 4 Drawing Sheets

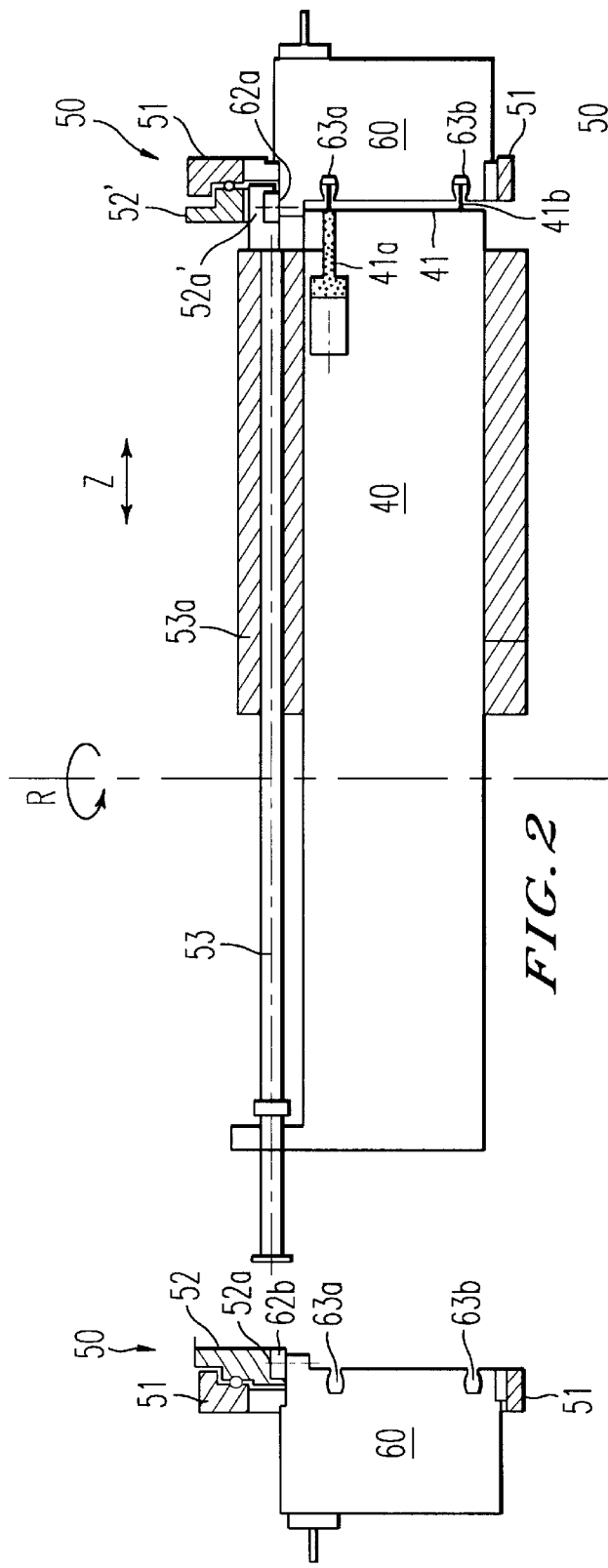
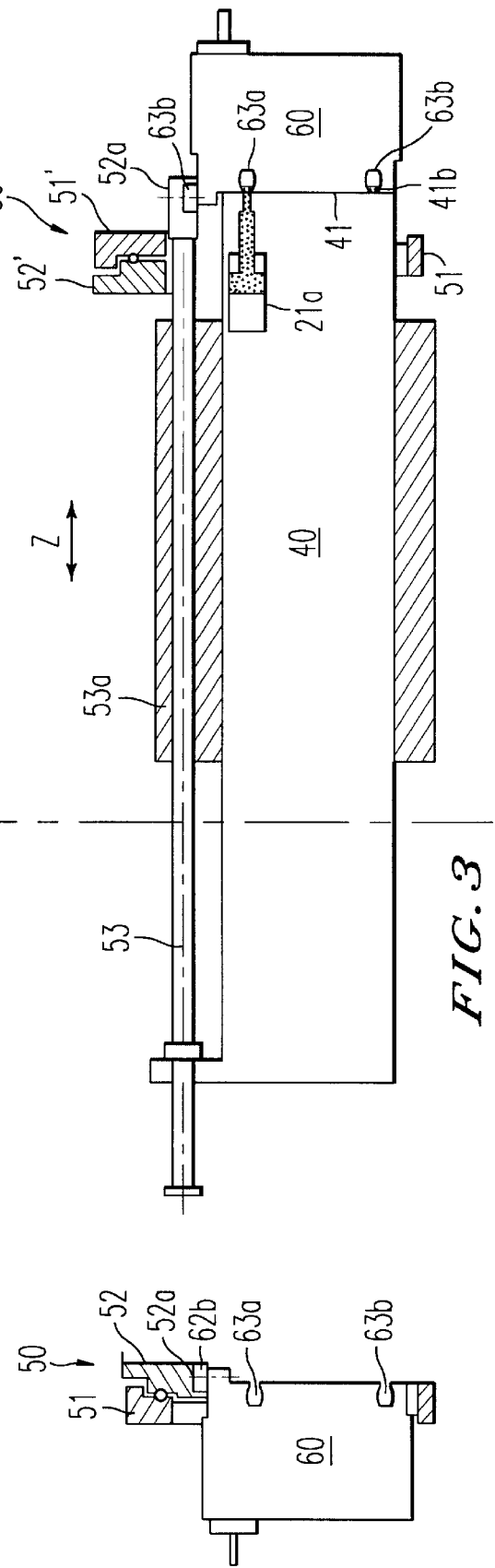

COUPLING MECHANISM FOR TOOL CASSETTES IN A MACHINING UNIT

The present invention relates to the machine-tool area and more particularly to a numerically controlled machining unit for transfer machines.

In its French Patent No. 85.02897, the Applicant proposed a numerically controlled three-axis (X, Y, Z) machining unit for transfer machines. This unit, as illustrated by a perspective view in the drawing of FIG. 1, is constructed as a frame 10 comprised substantially of a bed 11 equipped with a pair of rails 12 and 13 to permit sliding of a vertical crosspiece 20 surmounting the said bed in the form of a horizontal movement illustrated by arrow X. This crosspiece 20, of one-piece construction with two posts 21 and 22, is equipped with a pair of rails 21a and 22a on which there slides in the form of a vertical movement illustrated by arrow Y, a head 30 traversed by a spindle-holding slide 40 advancing by a horizontal movement (arrow Z) normal to the X displacement. A magazine 50 constructed as a ring 51 for carrying tool cassettes 60 is engaged on the head 30 so as to encircle the crosspiece 20. In the context of the present invention, "cassette" means a housing containing a kinematic linkage that develops the drive for one or more machining spindles, thus allowing diverse operations such as:

face milling by copying for gearboxes, milling by contouring for gear pumps, milling with staircase starting point for breeches and steering knuckles, milling with bore blank, precision bores with precise center distance, routing, internal and external thread cutting, holes of diverse dimensions at diverse positions according to the options, etc.

to be performed on the pieces to be machined.

The ring 51 of magazine 50 is mounted for rotation around bracket 20 in the form of a rotational movement illustrated by arrow R, in such a way that the cassette 60, selected as a function of the type of machining operation to be accomplished, can be positioned facing the carrier end 41 of slide 40. The Z displacement control of slide 40, the carrier end 41 of which is outfitted to receive and fix the cassette 60 selected by ring 51, then permits the said selected cassette 60 to be directly guided thereacross up to the piece to be machined, thus obviating the involvement of a tool-changing arm. In order to ensure the machining operations on the said piece, slide 40 incorporates a motor drive device 42 cooperating with the kinematic linkage of the attached cassette 60 to ensure, at the carrier end 41 thereof, that the different spindles disposed on the attached cassette 60 are made to rotate (arrow r).

In this unit, cassette 60 is more particularly fixed at the carrier end 41 of slide 40 via a cassette-holding plate 61, which also constitutes the means for attaching cassettes 60 to ring 51 of magazine 50. For this purpose the cross section of these plates 61 has dimensions equal to those of the cross section of the carrier end 41 of slide 40, thus making it possible, by means of a plurality of tie rods parallel to motor drive device 42, to ensure that a plate 61 is locked in place on the carrier end 41 of slide 40.

Although the general embodiment of the machining unit of its French Patent No. 85.02897 constitutes an indisputable improvement compared with the operation of prior art machines extant at that time, it is nevertheless now open to potential improvements, especially in the mechanism actuating the attachment system of the cassette-holding plates, the complexity of which remains an obstacle both in terms of construction cost and operation. In fact, the sources of failure of this mechanism are if anything more numerous, especially since certain parts, especially the tie rods, necessitate considerable adjustment, checking and maintenance tasks or even replacement as a result of extensive wear phenomena. In addition, the risk incurred by such a mechanism is that the cassette carried by the carrier end of the slide in question and wobbling under the effect of looseness or wear, will break loose from the carrier end of the slide, thus causing the cassette to drop.

Starting from these observations and a preestablished set of specifications, the Applicant has therefore conducted studies aimed at improving the cassette attachment mechanism by perfecting the guidance thereof in the magazine and by guaranteeing the connection thereof with the slide during the phases of machining of pieces and engagement and/or arrangement of cassettes. These studies have culminated in an original embodiment of a mechanism for attaching cassettes on the carrier end of the slide of a numerically controlled machining unit.

To develop the object of the present invention, and for better comprehension thereof, the example of the three-axis machining unit such as proposed in French Patent No. 85.02897 is used for support, but it is self-evident that the proposed attachment mechanism can be integrated into any other transfer machine of this type, including those with two axes or a single axis.

One of the first objects of the invention by which this new concept of the cassette attachment mechanism can be applied is to guide the carrier ring of the rotary magazine (arrow R) around a circular track integral with the frame and preformed with at least one slideway in which rolling elements joined to the cassettes are retained and guided. The layout of this circular track steering the rotation R of ring 51 has the major advantage of retaining and guiding, in the said slideway (fixed relative to the frame), the cassettes driven in rotation (arrow R) by the said ring around the crosspiece. This correction of cassette rotation by a fixed element of the frame in the form of the slideway of the circular track makes it possible to finely adjust the operations of setting them and to guarantee that they will be maintained on the magazine.

The presence of this circular track makes it possible, according to the fundamental concepts of the invention, to devise a mobile slideway sector disposed facing the said spindle-holding slide for the purpose of following the displacements thereof. In this way, the mobile slideway sector, in which there are also seated the rolling elements of the selected cassette brought in front of the slide, can then accompany the advance movements of this slide which, in its displacements across the head and the magazine, drives the cassette and the mobile slideway sector engaged by the rolling elements thereof.

Another object of the invention is to join the mobile slideway sector to the end of an arm guided in translation in a support integral with the frame and intended to accompany the displacements of the said slideway sector entrained by the rolling elements of the cassette displaced by the spindle-holding slide.

Another object of the invention is to form, in the vertical anterior face of the cassettes, opposite the face of the machining spindles and intended to become positioned facing the carrier end of the slide, at least one groove which, preferably having a T-shaped cross section extending (partly or completely) over the width of the cassettes, is intended to cooperate with at least one gripping device disposed at the carrier end of the slide. In this way, when the groove of the selected cassette is positioned facing the gripping device of the carrier end of the slide, the rotation R of the cassette driven by the ring of the magazine then automatically urges the said device into the groove, and does so before the rolling devices have disengaged from the track of the magazine. By joining this gripping device to a simple flanging means inside the T of the groove, an infallible, easy-to-use mechanism of simple construction is obtained for attaching cassettes to the slide. In addition, if the flanging means were to become defective, the gripping device alone would be able to define an element for maintaining the cassette on the slide.

Although the general concept of the invention has been disclosed hereinabove in its most elementary form, more ample details concerning a preferred embodiment of a mechanism, respecting the fundamental concepts of the invention, for attaching cassettes to the slide of a numerically controlled machining unit will be better understood by referring to the description hereinbelow and to the accompanying drawings illustrating this embodiment.

On these drawings:

FIGS. 2 and 3 are cross-sectional views of the slide 40 and of the magazine 50 of the three-axis machining unit of FIG. 1, integrating the attachment mechanism according to the invention.

Figure 1:
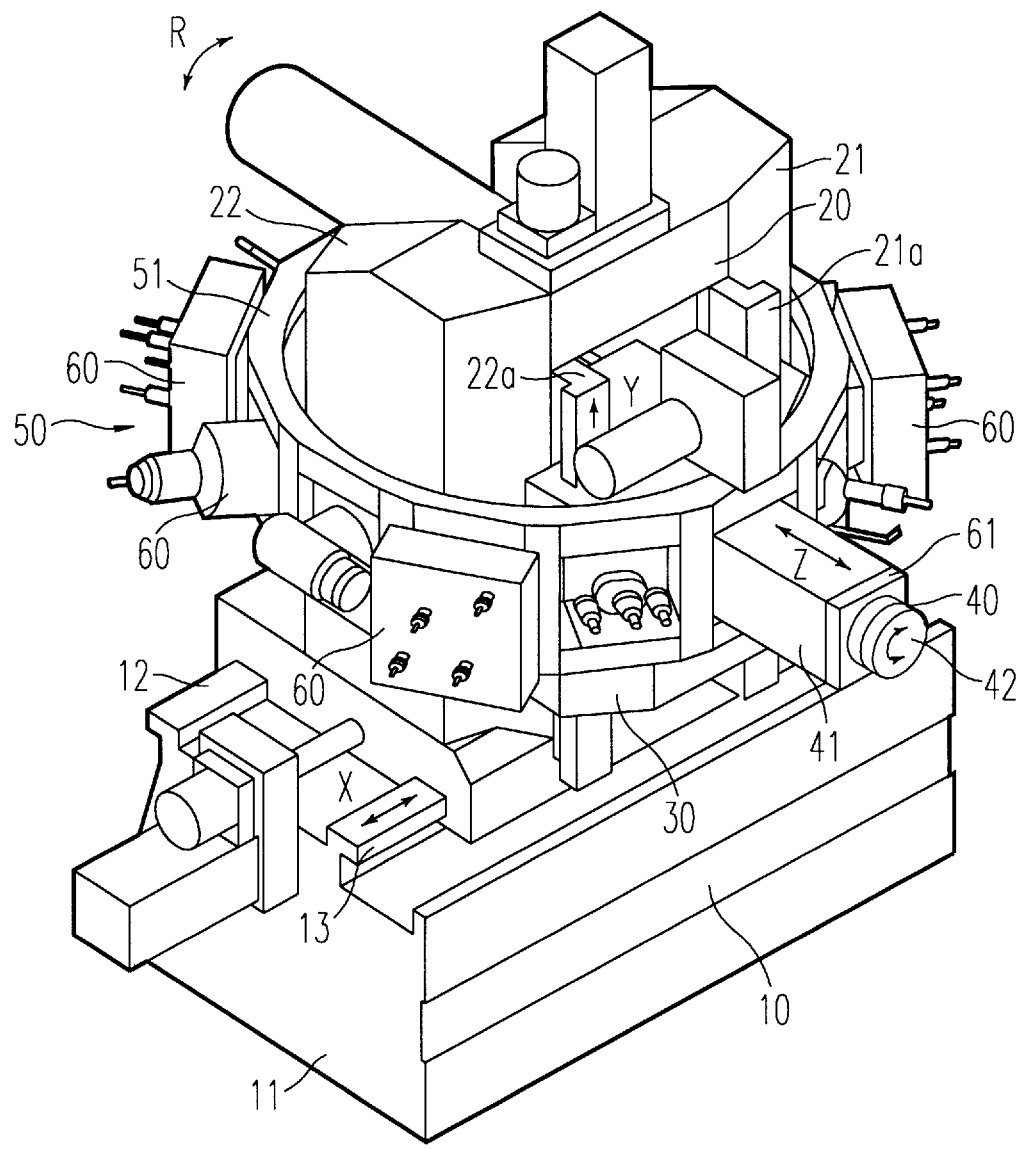

The drawings of FIGS. 2 and 3 illustrate the slide 40, the magazine 50 and the tool cassettes 60 of the numerically controlled three-axis machining unit such as represented on the drawing of FIG. 1 but incorporating a new mechanism, respecting the fundamental concepts of the invention, for attaching the cassettes 60. For better understanding of the explanation to follow, the right portion of the drawings illustrates the magazine 50 with a cassette 60 that has been selected and positioned facing the slide 40, while the left portion of the drawings illustrates a cassette 60 that has not been selected and is installed in the magazine 50 in a position diametrically opposite the first cassette.

Figure 4:
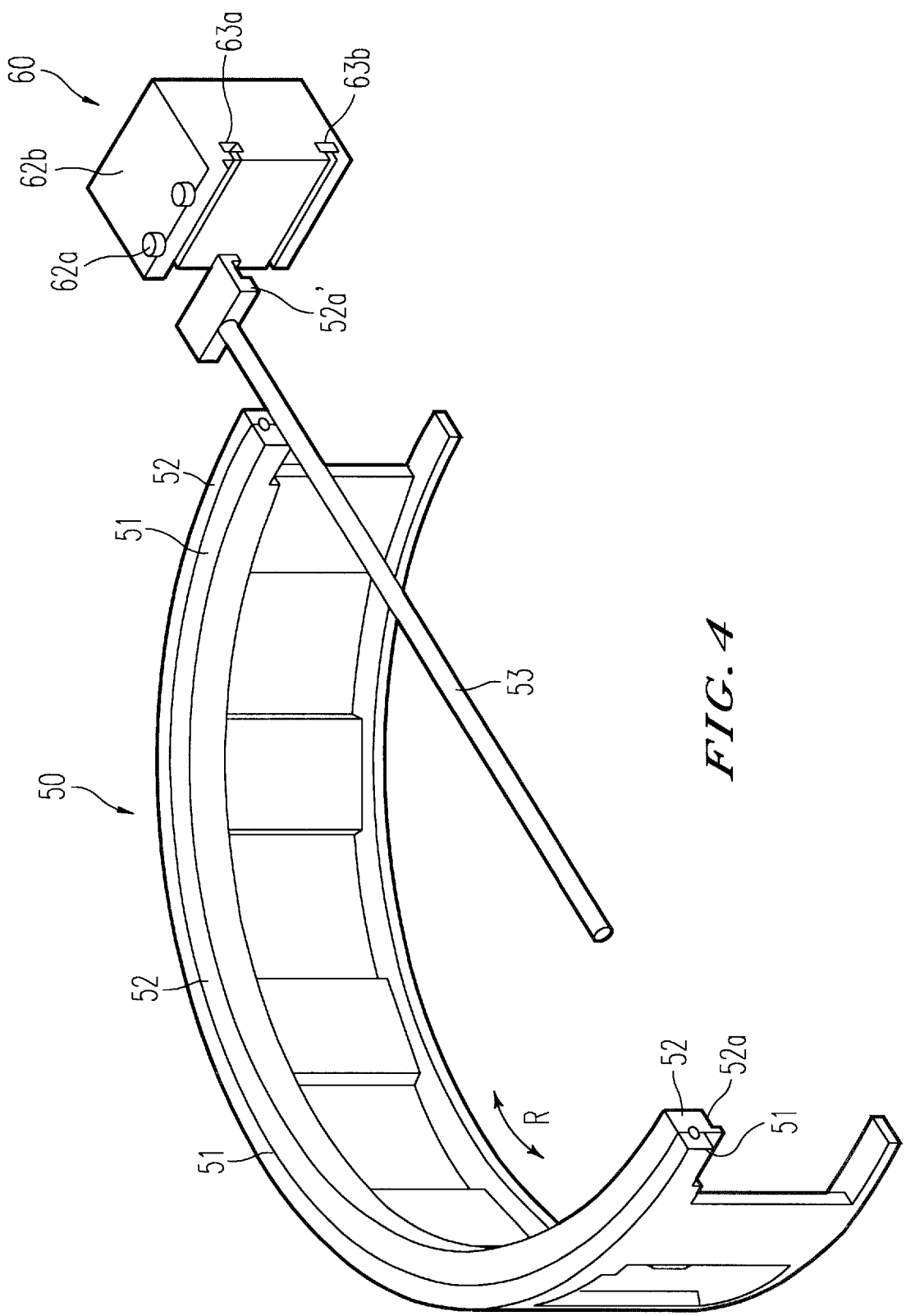
FIG. 4 is an exploded perspective view of the different devices of this attachment mechanism.

According to the invention, the ring 51 of the rotary magazine 50, retaining the cassettes 60, is guided in its rotating movement (arrow R) around a circular track 52 joined to the frame 10 of the machine at the level of the upper part of ring 51. As can be seen in more detail with reference to the left portion of the drawings, the base of the track 52 is provided with a slideway 52a, which is drawn as a square part and in which rollers 62a and 62b, disposed in pairs on the upper wall of the cassettes 60 as shown in the drawing of FIG. 4, can slide and be retained. This square slideway 52a defines a rolling path for the rollers 62a and 62b of the cassettes 60 when the ring 51 is driven in rotation (arrow R) around the circular track 51 [sic: 52].

Figure 5:
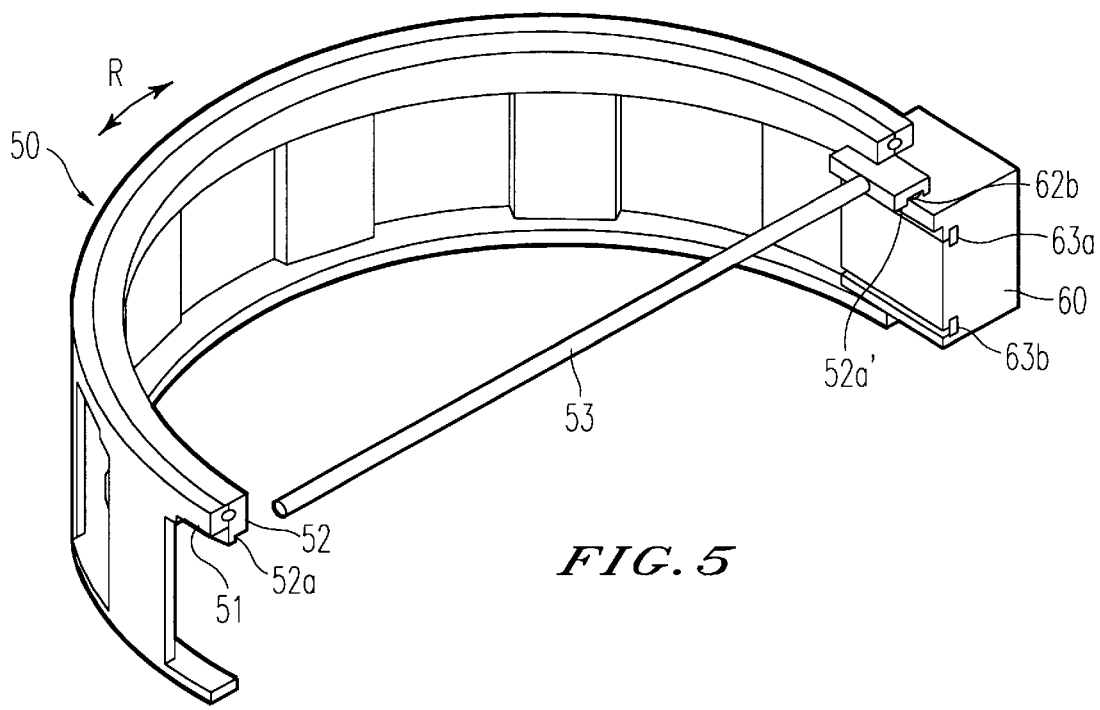
FIGS. 5 and 6 are perspective views showing the operation of this attachment mechanism.
Figure 6:
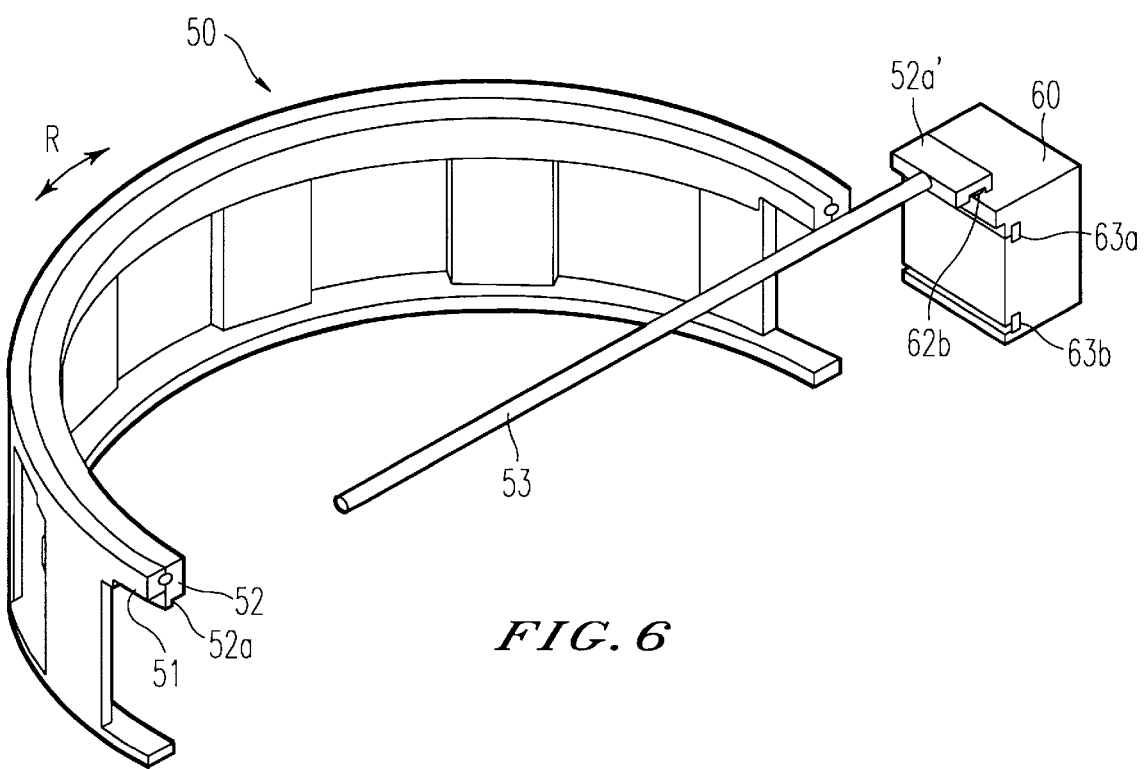

Referring to the right portion of the drawings of FIGS. 3 and 4 and to the group of FIGS. 4, 5 and 6, the circular track 52 comprises, in its portion situated facing the spindle-holding slide 40, a slideway sector 52a' having an inverted U-shaped profile in the extension of the square profile of the fixed slideway 52a and endowed with mobility allowing it to follow the displacements (arrow Z) of the said slide such that, when the selected cassette 60 is attached to the carrier end 41 of the slide 40, the U-shaped slideway sector 52a', entrained by rollers 62a and 62b of the cassette 60 seated in the interior, becomes detached from track 52' to follow the slide, as shown in the drawings of FIGS. 3 and 6. In order to assist the displacements (arrow Z) of mobile slideway sector 52a', this mobile slideway sector 52a' is joined to the end of an arm 53 guided in translation (arrow Z) inside a support 53a integral with frame 10.

The cassettes 60 comprise, in their vertical anterior face intended to become positioned facing the carrier end 41 of slide 40, two parallel grooves 63a and 63b, each having a T-shaped cross section formed in a portion of the width of the said cassettes. These grooves 63a and 63b cooperate with the appropriate gripping devices 41a and 41b disposed at the carrier end 41 of slide 40 in such a way that, when the selected cassette 60 begins to be positioned facing the said carrier end 41, the gripping devices 41a and 41b are urged progressively and automatically into the grooves 63a and 63b under the effect of the rotation R of cassette 60, which finally becomes positioned in front of the carrier end of slide 40. These gripping devices 41a and 41b are joined to simple flanging means that make it possible to consolidate the attachment of the selected cassette 60 to the slide 40. In this way, the drive motor device 42 disposed at the carrier end 41 of the slide 40 (see FIG. 1) can then cooperate with the kinematic linkage of the housing of the cassette 60, which is now ready to perform its machining operations. These grooves 63a and 63b will be configured over the width of the cassettes 60 in such a way that they cooperate with the circular movement R of the gripping devices 41a and 41b. Thus these grooves will be provided with a curvilinear preformed shape or, for reasons of manufacturing simplification, will at least be divided into sectors over the circular course of the said gripping devices in such a way that they are located facing these latter in attachment position. Similarly, the T-shaped profile of these grooves will be provided with inclined flats for better distribution of the forces of the gripping devices, which will be logically arranged by the person skilled in the art.

It is be understood that the foregoing description and illustration of the cassette attachment mechanism have been provided for the purpose of disclosure and not by way of limitation. Obviously the foregoing example can be set up, modified and improved in various ways without departing from the scope of the invention taken in its broadest aspects and spirit.

To permit better understanding of the drawings, a list of the reference numbers with their meanings is presented hereinbelow.

| | |
|---|---|
| 10 | Frame |
| 11 | Bed |
| 12, 13 | Rails of bed 11 |
| 20 | Crosspiece |
| 21, 22 | Posts of crosspiece 20 |
| 21a, 22a | Rails of posts 21, 22 |
| 30 | Head |
| 40 | Slide |
| 41 | Carrier end of slide 40 |
| 41a, 41b | Gripping devices |
| 42 | Drive motor device |
| 50 | Magazine |
| 51 | Ring of magazine 50 |
| 52 | Fixed circular track |
| 52a | Fixed square slideway |
| 52a' | Mobile slideway sector with inverted U shape |
| 53 | Guide arm of slideway sector 52a' |
| 53a | Support of guide arm 53 |
| 60 | Tool cassettes |
| 61 | Cassette-holding plate |
| 62a, 62b | Track rollers for maintaining the cassettes |
| 63a, 63b | T-shaped grooves of the cassettes |
| Arrow X | Sliding movement of crosspiece 20 |

-continued

| | |
|---|---|
| Arrow Y | Sliding movement of head 30 |
| Arrow Z | Sliding movement of slide 40 |
| Arrow R | Rotational movement of ring 51 |
| Arrow r | Rotational movement of spindle-holding control device 42 [42 = drive motor] |

I claim:

1. A numerically controlled machining unit for transfer machines comprising a frame on which there is mounted for rotation (arrow R) a magazine constructed by a ring for carrying tool cassettes and capable of being traversed by a spindle-holding slide and in which ring of the said rotary magazine is guided in its rotational movement around a circular track integral with the frame and preformed such that it can also accompany the rotational movement of the cassettes being driven around the said track, characterized in that the circular track for guiding the magazine carries a fixed slideway in which there are retained and guided guide rollers joined to the tool cassettes and situated on the upper wall of the cassettes, and in that said fixed slideway guiding them is formed at the base of the circular track disposed in the upper part of the magazine.

2. A unit according to claim 1, wherein the said circular track integral with the frame comprises, at the level of said spindle-holding slide, a mobile slideway sector for following the displacements of the said slide.

3. A unit according to claim 2, wherein the said mobile slideway sector has an inverted U-shaped profile disposed in the extension of the square profile of said fixed slideway.

4. A unit according to claim 2, wherein the said mobile slideway sector is joined to an arm urged in translation in a support integral with the frame, so as to accompany, together with the spindle-holding slide, the displacements of said mobile slideway sector engaged by the rollers of the cassette attached to said slide.

5. A unit according to claim 1, wherein the said cassettes comprise, in their vertical anterior wall intended to become positioned facing the carrier end of the spindle-holding slide, at least one groove, formed partly or completely over the width of the cassettes in order to cooperate with a gripping device disposed at said carrier end, which engages slidingly in the said groove under the effect of the rotation of the cassette.

6. A unit according to claim 5, wherein the said gripping device is assisted by a simple appropriate flanging means inside the profile of the groove to reinforce the attachment of the cassette to said carrier end.

7. A unit according to claim 5, wherein the said groove of the cassettes has a T-shaped cross section having inclined flats for force distribution.

8. A unit according to claim 5, wherein the said groove has a curvilinear preformed shape matching the circular trajectory of said gripping device.

9. A unit according to claim 5, wherein the said groove is divided into sectors matching the circular course of said gripping device.

10. A unit according to claim 2, wherein the said cassettes comprise, in their vertical anterior wall intended to become positioned facing the carrier end of the spindle-holding slide, at least one groove, formed partly or completely over the width of the cassettes in order to cooperate with a gripping device disposed at said carrier end, which engages slidingly in said groove under the effect of the rotation of the cassette.

11. A unit according to claim 3, wherein the said cassettes comprise, in their vertical anterior wall intended to become positioned facing the carrier end of the spindle-holding slide, at least one groove, formed partly or completely over the width of the cassettes in order to cooperate with a gripping device disposed at said carrier end, which engages slidingly in said groove under the effect of the rotation of the cassette.

12. A unit according to claim 4, wherein the said cassettes comprise, in their vertical anterior wall intended to become positioned facing the carrier end of the spindle-holding slide, at least one groove, formed partly or completely over the width of the cassettes in order to cooperate with a gripping device disposed at said carrier end, which engages slidingly in said groove under the effect of the rotation of the cassette.

* * * * *